United States Patent
Sato

(10) Patent No.: US 8,599,259 B2
(45) Date of Patent: Dec. 3, 2013

(54) EXTERIOR MIRROR FOR VEHICLE

(75) Inventor: Hidenori Sato, Fujieda (JP)

(73) Assignee: Murakami Corporation, Shizuoka (JP)

( * ) Notice: Subject to any disclaimer, the term of this patent is extended or adjusted under 35 U.S.C. 154(b) by 861 days.

(21) Appl. No.: 12/704,891

(22) Filed: Feb. 12, 2010

(65) Prior Publication Data
US 2010/0238292 A1 Sep. 23, 2010

(30) Foreign Application Priority Data
Mar. 19, 2009 (JP) .................................. 2009-68151

(51) Int. Cl.
- *H04N 7/18* (2006.01)
- *G02B 5/08* (2006.01)
- *B60Q 1/26* (2006.01)

(52) U.S. Cl.
USPC ............................ 348/148; 359/838; 362/494

(58) Field of Classification Search
USPC ........................................................ 348/148
See application file for complete search history.

(56) References Cited

U.S. PATENT DOCUMENTS

| | | | |
|---|---|---|---|
| 6,959,994 B2 | 11/2005 | Fujikawa et al. | |
| 2003/0098908 A1 | 5/2003 | Misaiji et al. | |
| 2003/0214733 A1* | 11/2003 | Fujikawa et al. | 359/838 |
| 2004/0145722 A1* | 7/2004 | Uomori et al. | 356/4.01 |
| 2009/0040778 A1 | 2/2009 | Takayanagi et al. | |

FOREIGN PATENT DOCUMENTS

| | | |
|---|---|---|
| CN | 1421340 | 6/2003 |
| JP | 2000-115759 | 4/2000 |
| JP | 2002-308014 | 10/2002 |
| JP | 2003-267140 | 9/2003 |
| JP | 2003-327048 | 11/2003 |
| JP | 2004-182040 | 7/2004 |
| JP | 2006-109171 | 4/2006 |

OTHER PUBLICATIONS

Japan Office action, dated Jun. 28, 2011 along with an english translation thereof.
China Office action, mail date is Apr. 15, 2013.

\* cited by examiner

*Primary Examiner* — Backhean Tiv
*Assistant Examiner* — Alan S Chou
(74) *Attorney, Agent, or Firm* — Greenblum & Bernstein P.L.C.

(57) ABSTRACT

To facilitate discrimination of a curb, a gutter or the like by using an infrared illuminating device and an infrared-sensitive image pickup device mounted on an exterior mirror of a vehicle when the vehicle is pulled over to a shoulder at night. Two illuminating devices having optical axes oriented downward are mounted on a housing of a side mirror at a distance from each other in the lateral direction of a vehicle. The illuminating devices alternately emit infrared light downwardly. An image pickup device sensitive to infrared light having an optical axis oriented downward is mounted on the housing at a middle position between the left and right illuminating devices. An image taken by the image pickup device is displayed on an image monitor disposed at a position where the monitor can be viewed from the driver seat.

5 Claims, 6 Drawing Sheets

REGION OF SHADOW CAST BY LEFT ILLUMINATING DEVICE
BLIND SPOT OF IMAGING DEVICE
REGION OF SHADOW CAST BY RIGHT ILLUMINATING DEVICE
REGION OF SHADOW CAST BY RIGHT ILLUMINATING DEVICE APPEARING IN IMAGE TAKEN BY IMAGING DEVICE

RIGHT ILLUMINATING DEVICE IS ON

LEFT ILLUMINATING DEVICE IS ON

RIGHT ILLUMINATING DEVICE IS ON

LEFT ILLUMINATING DEVICE IS ON

REGION OF SHADOW CAST BY RIGHT ILLUMINATING DEVICE APPEARING IN IMAGE TAKEN BY IMAGING DEVICE

REGION OF SHADOW CAST BY LEFT ILLUMINATING DEVICE

BLIND SPOT OF IMAGING DEVICE

REGION OF SHADOW CAST BY RIGHT ILLUMINATING DEVICE

RIGHT ILLUMINATING DEVICE IS ON

LEFT ILLUMINATING DEVICE IS ON

RIGHT ILLUMINATING DEVICE IS ON

LEFT ILLUMINATING DEVICE IS ON

EXTERIOR MIRROR FOR VEHICLE

The disclosure of Japanese Patent Application No. JP2009-68151 filed on Mar. 19, 2009 including the specification, drawings, claims and abstract is incorporated herein by reference in its entirety.

BACKGROUND OF THE INVENTION

1. Field of the Invention

The present invention relates to an exterior mirror for a vehicle that incorporates at least one illuminating device that emits infrared light and an image pickup device that is sensitive to infrared light, which allows a driver to readily recognize the approaching state (distance) between the vehicle and a curb, a gutter or the like when the driver pulls over to the shoulder at night.

2. Description of the Related Art

Japanese Patent Laid-Open Nos. 2000-115759, 2003-267140, 2003-327048, and 2004-182040 describe a passenger-seat side mirror having an illuminating device and an image pickup device both facing downwardly, in which the image pickup device takes an image of a lower blind spot outside the passenger seat side of the vehicle (at night, the illuminating device illuminates the blind spot, and the image pickup device takes an image thereof), and the image is displayed on an image monitor installed in the vehicle to allow the driver to visually check the blind spot.

SUMMARY OF THE INVENTION

Vehicle regulations prohibit the use of visible light for the illuminating device mounted on the side mirror, so that illuminating devices that emit infrared light are used. The infrared light has a short wavelength (around 870 nm, for example), and therefore, the image pickup device can only produces a monochrome image at night. However, it is difficult to discriminate a curb, a gutter or the like in the monochrome image displayed on the image monitor. Thus, the approaching state between the vehicle and the curb, the gutter or the like is difficult to determine from the image displayed on the image monitor, and therefore, it is hard to pull the vehicle over to the shoulder at night.

The present invention has been made in view of the circumstances described above, and an object of the present invention is to provide an exterior mirror for a vehicle that facilitates pulling a vehicle over to a shoulder at night by facilitating estimation of the approaching state between the vehicle and a curb, a gutter or the like.

The present invention provides an exterior mirror for a vehicle comprising: left and right illuminating devices that are mounted on external arrangement sections of the exterior mirror for a vehicle that protrude from a side surface of the vehicle at a distance from each other in the lateral direction of the vehicle and emit infrared light downwardly (the direction is not limited to the vertically downward direction but may be somewhat inclined from the vertically downward direction); a lighting control device that alternately turns on the left and right illuminating devices; and an image pickup device sensitive to infrared light that is mounted to face downwardly (the direction is not limited to the vertically downward direction but may be somewhat inclined from the vertically downward direction) at a middle position between the left and right illuminating devices mounted on the external arrangement sections and takes an image of a lower area at the side of the vehicle illuminated by the left and right illuminating devices. According to the present invention, when the vehicle approaches a curb, a gutter or the like, the image pickup device takes an image of the shadow of the curb, the gutter or the like cast by the infrared light from the left and right illuminating devices. The shadow can be more readily discriminated in the monochrome image than the image of the curb, the gutter or the like itself. If the left and right illuminating devices are alternately turned on, the pattern of the shadow changes with the approaching state between the vehicle and the curb, the gutter or the like. Therefore, the approaching state between the vehicle and the curb, the gutter or the like can be readily recognized from the change of the pattern of the shadow. Thus, the vehicle can be readily pulled over.

The exterior mirror for a vehicle according to the present invention may further comprise a display control device that displays the image taken by the image pickup device on an image monitor. Alternatively, the curb, the gutter or the like in the image taken by the image pickup device can be recognized by using a pattern recognition technique, and the driver can be informed of the approaching state between the vehicle and the curb, the gutter or the like by using light or sound.

DETAILED DESCRIPTION OF THE PREFERRED EMBODIMENTS

Figure 1:
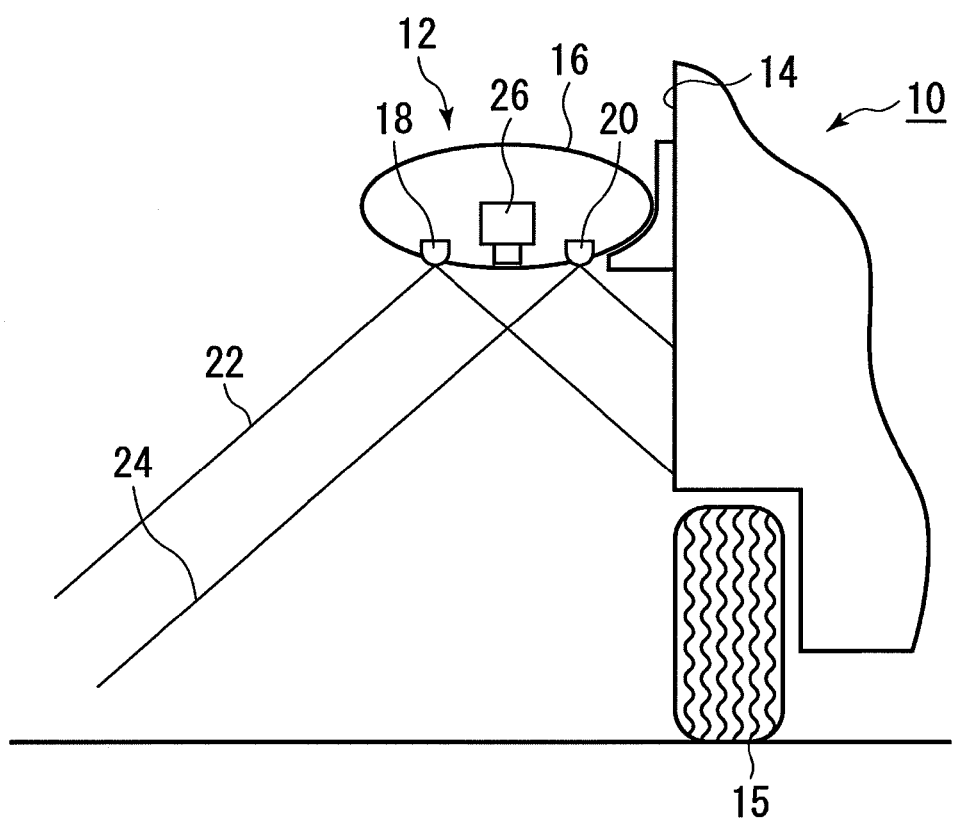
FIG. 1 is a diagram showing an arrangement of illuminating devices and an image pickup device of a side mirror to which the present invention is applied, viewed from the rear of a vehicle 10.

In the following, an embodiment of the present invention will be described. FIG. 1 shows an arrangement of illuminating devices and an image pickup device of a side mirror to which the present invention is applied (viewed from the rear of a vehicle 10). The vehicle 10 is a car with a right-hand steering wheel, and the present invention is applied to a left side mirror 12. The side mirror 12 has a housing 16 that outwardly protrudes from a side surface 14 of the vehicle 10, and two illuminating devices 18 and 20 spaced apart from each other in the lateral direction of the vehicle are mounted on the lower surface of the housing 16 with the optical axes being oriented downward. The illuminating devices 18 and 20 are near-infrared LEDs or the like and downwardly emit infrared lights (more strictly, near-infrared lights) 22 and 24. An image pickup device 26 sensitive to infrared light (strictly, near-infrared light), such as a near-infrared CCD camera, is mounted on the lower surface of the housing 16 at a middle position between the illuminating devices 18 and 20 (a position spaced apart from both the illuminating devices 18 and 20, a middle position between the optical axes of the illuminating devices 18 and 20 in this embodiment) with the optical axis extending downwardly. The distance between the optical axis of the image pickup device 26 and the left illuminating device 18 and the distance between the optical axis of the image pickup device 26 and the right illuminating device 20 are each 5 cm or more, for example. The image pickup device 26 takes an image of a lower spot on the left side of the vehicle illuminated by the illuminating devices 18 and 20.

Figure 2:
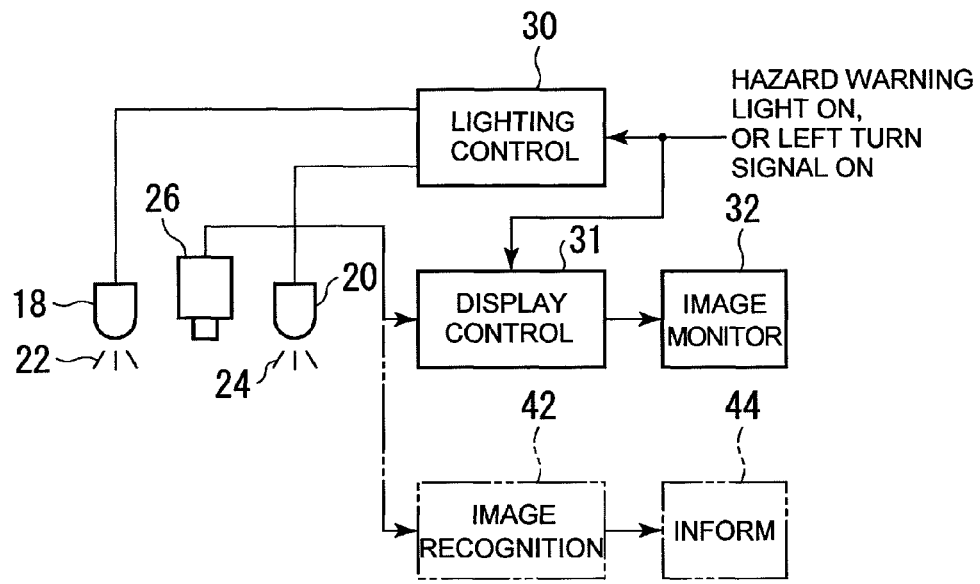
FIG. 2 is a block diagram showing a signal system of illuminating devices 18 and 20 and an image pickup device 26 shown in FIG. 1.

FIG. 2 shows a signal system of the illuminating devices 18 and 20 and the image pickup device 26. A lighting control device 30 controls lighting of the illuminating devices 18 and 20. For example, the lighting control device 30 turns on the illuminating devices 18 and 20 in a temporally staggered manner during the hazard warning light is flashing or the left turn signal (the turn signal opposite to the driver side) is flashing (to indicate that the vehicle 10 pulls over to the left shoulder), for example. In that case, the illuminating devices 18 and 20 can be turned on under the condition that the headlight or the side marker light is turned on (that is, the illuminating devices 18 and 20 can be turned on only when the outside is dark).

In synchronization with the illuminating devices 18 and 20 being alternately turned on, a display control device 31 displays an image (video image) taken by the image pickup device 26 on an image monitor 32, such as a liquid crystal display, in real time. The image monitor 32 is disposed at a position where the monitor can be viewed by the driver in the driver seat (on the dashboard, for example). When the driver pulls over to the left shoulder, the driver can recognize the approaching state to (distance from) a curb, a gutter or the like from the image displayed on the image monitor 32.

Figure 3:
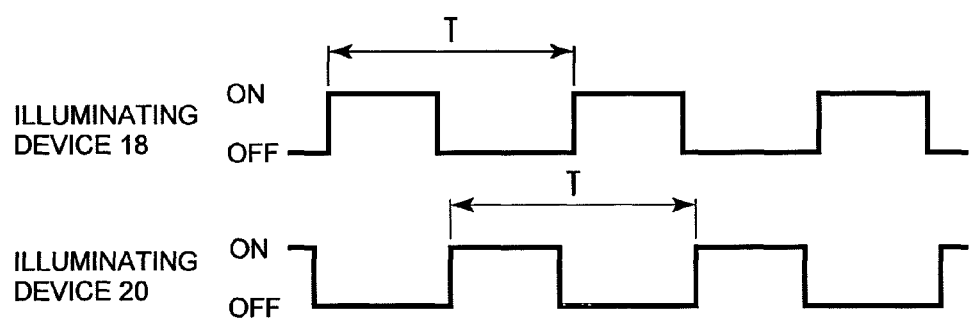
FIG. 3 is a timing chart showing an example of lighting control of the illuminating devices 18 and 20 by a lighting control device 30 shown in FIG. 2.

FIG. 3 shows an example of lighting control of the illuminating devices 18 and 20 by the lighting control device 30. The illuminating devices 18 and 20 are alternately turned on and off. The lighting period T of the illuminating devices 18 and 20 is preferably long enough for the driver, while the driver is viewing the image on the image monitor 32, to distinguish between the image taken when the illuminating device 18 is turned on and the image taken when the illuminating device 20 is turned on and short enough for the driver to determine in real time whether or not the vehicle is adequately pulled over to the shoulder from the difference between the images taken by the illuminating devices 18 and 20 alternately turned on. For example, the lighting period T can be 0.3 seconds to 3 seconds (for example, around 1 second).

Figure 4:
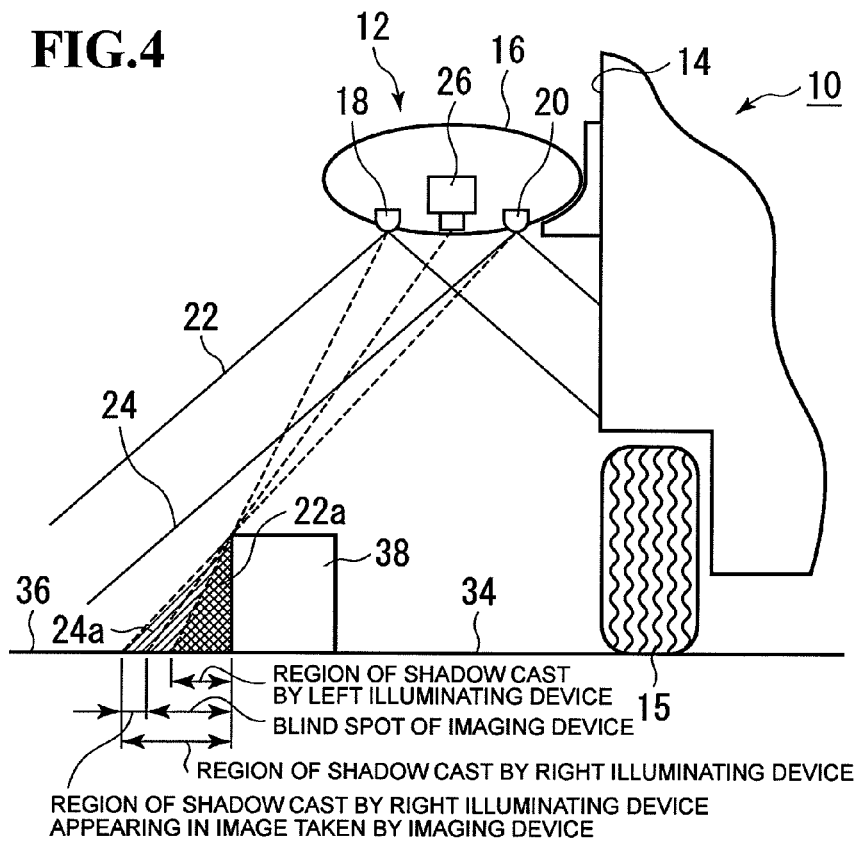
FIG. 4 is a diagram showing a positional relationship between a vehicle 10 shown in FIG. 1 being pulled over and a curb 38 in a situation where the vehicle 10 has not adequately approached the curb 38.
Figure 5A:
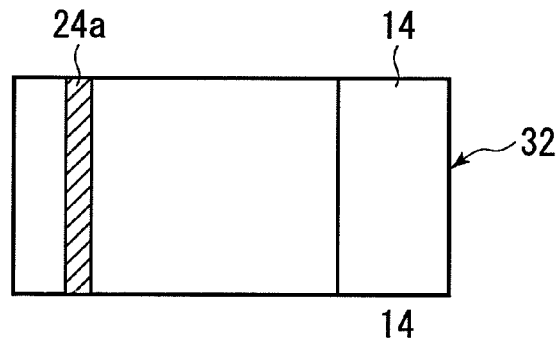
FIGS. 5A and 5B show images alternately displayed on a screen of an image monitor 32 shown in FIG. 2 in the situation shown in FIG. 4.
Figure 5B:
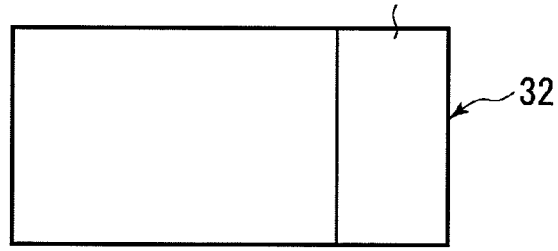
Figure 6:
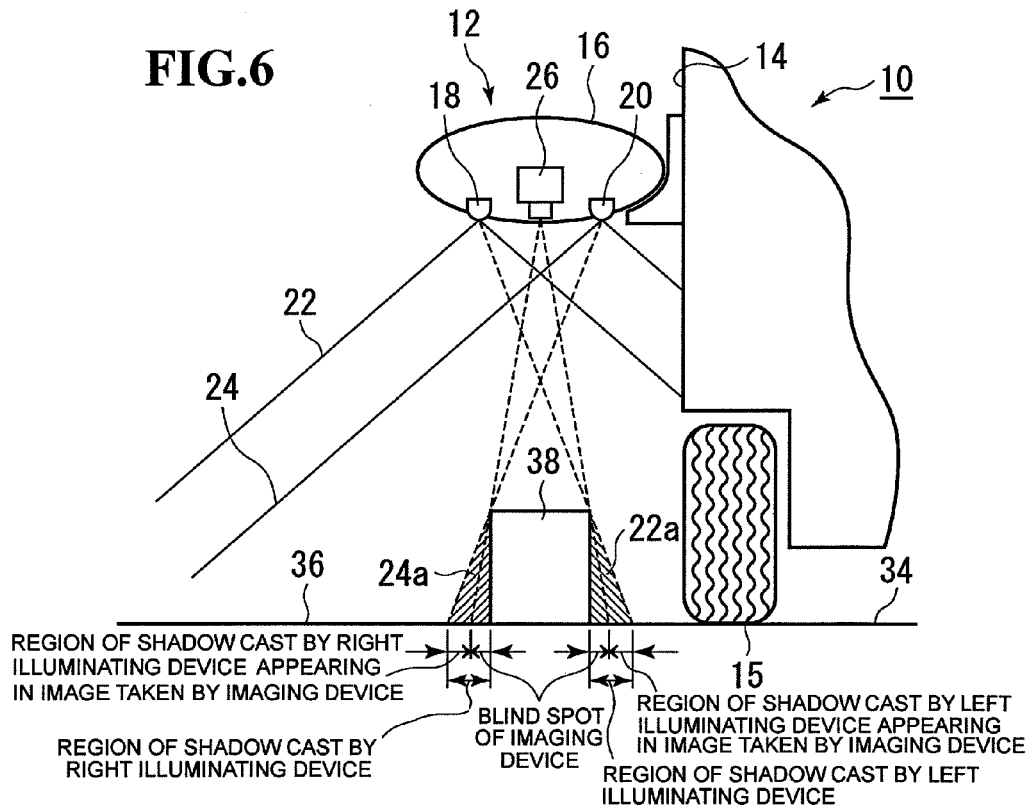
FIG. 6 is a diagram showing a positional relationship between the vehicle 10 shown in FIG. 1 being pulled over and the curb 38 in a situation where the vehicle 10 has adequately approached the curb 38.
Figure 7A:
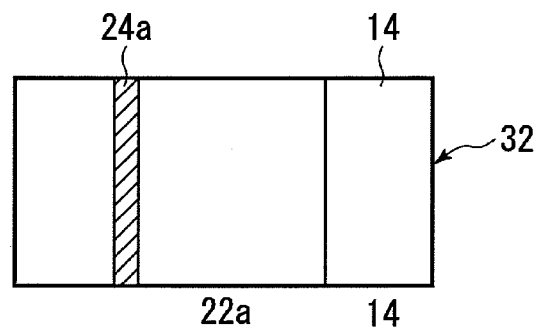
FIGS. 7A and 7B show images alternately displayed on the screen of the image monitor 32 shown in FIG. 2 in the situation shown in FIG. 6.
Figure 7B:
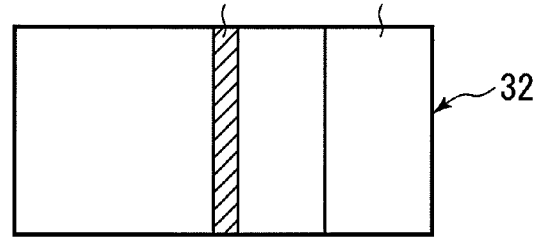

Changes of the image displayed on the image monitor 32 when the vehicle 10 is pulled over to the left shoulder of the road using the devices shown in FIGS. 1 and 2 will be described. FIGS. 4 to 7 are diagrams for illustrating a case where there is a curb 38 at the boundary between a roadway 34 and a sidewalk 36. FIG. 4 shows a situation where the curb 38 lies within the field of view of the image pickup device 26, but the vehicle 10 has not adequately approached the curb 38 (reference numeral 15 denotes a tire). In this case, a shadow 22a of the curb 38 cast by infrared light 22 from the illuminating device 18 and a shadow 24a of the curb 38 cast by infrared light 24 from the illuminating device 20 alternately appear at the left side of the curb 38. The whole area of the shadow 22a is included in the area of the shadow 24a. The shadow 22a cast by the infrared light 22 completely lies within the blind spot of the image pickup device 26 caused by the curb 38 and therefore does not appear in the image taken by the image pickup device 26. As for the shadow 24a cast by the infrared light 24, a part outside the blind spot of the image pickup device 26 caused by the curb 38 appears in the image taken by the image pickup device 26. FIGS. 5A and 5B show images displayed on a screen of the image monitor 32 in this situation. The side surface 14 of the vehicle 10 appears at the right edge of the image. As shown in FIG. 5A, when the right illuminating device 20 is turned on, the shadow 24a appears in the image. As shown in FIG. 5B, when the left illuminating device 18 is turned on, the shadow 22a completely lies within the blind spot of the image pickup device 26 and therefore does not appear in the image. FIG. 6 shows a situation where the vehicle 10 has adequately approached the curb 38, and the image pickup device 26 is positioned directly above the curb 38. In this case, the shadow 22a of the curb 38 cast by the infrared light 22 from the illuminating device 18 and the shadow 24a of the curb 38 cast by the infrared light 24 from the illuminating device 20 alternately appear at the right side and the left side of the curb 38, respectively. FIGS. 7A and 7B show images displayed on the screen of the image monitor 32 in this situation. In synchronization with the illuminating devices 18 and 20 being alternately turned on, the shadow 24a shown in FIG. 7A and the shadow 22a shown in FIG. 7B alternately appear at horizontally different positions. Therefore, when the display changes from the images shown in FIGS. 5A and 5B to the images shown in FIGS. 7A and 7B, the driver can determine that the vehicle 10 has adequately approached the curb 38 and can stop the operation for pulling over.

Figure 8:
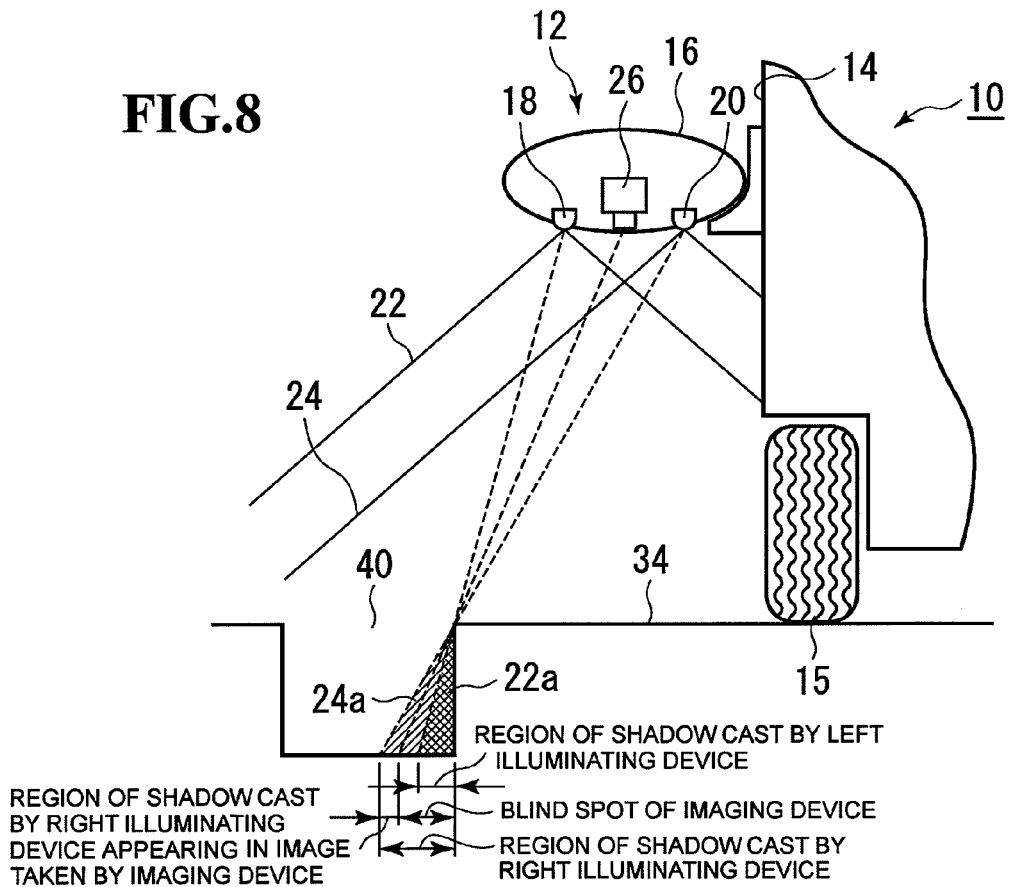
FIG. 8 is a diagram showing a positional relationship between the vehicle 10 shown in FIG. 1 being pulled over and a gutter 40 in a situation where the vehicle 10 has not adequately approached the gutter 40.
Figure 9A:
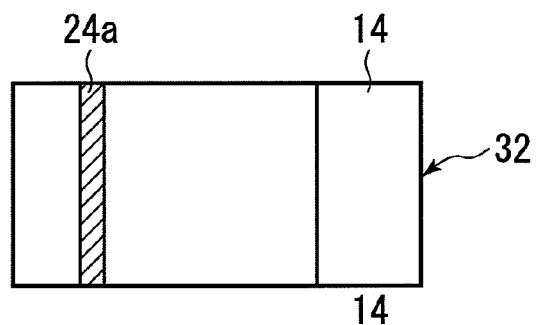
FIGS. 9A and 9B show images alternately displayed on the screen of the image monitor 32 shown in FIG. 2 in the situation shown in FIG. 8.
Figure 9B:
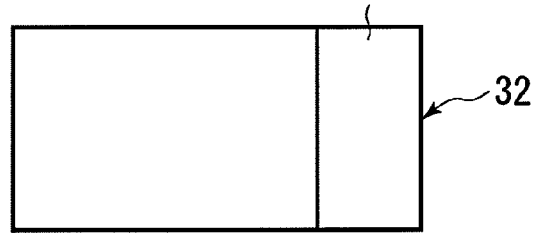
Figure 10:
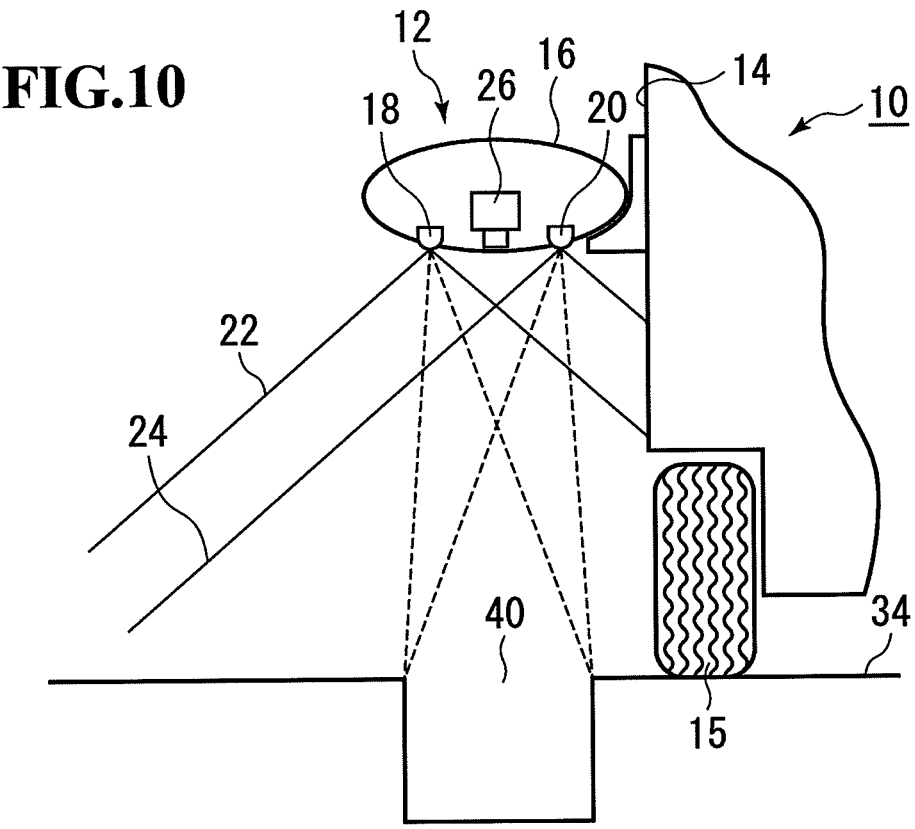
FIG. 10 is a diagram showing a positional relationship between the vehicle 10 shown in FIG. 1 being pulled over and the gutter 40 in a situation where the vehicle 10 has adequately approached the gutter 40.
Figure 11A:
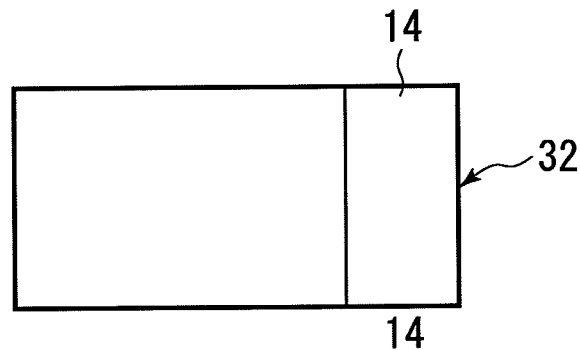
FIGS. 11A and 11B show images alternately displayed on the screen of the image monitor 32 shown in FIG. 2 in the situation shown in FIG. 10.
Figure 11B:
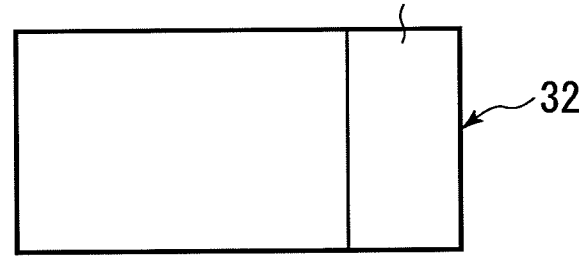

FIGS. 8 to 11 are diagrams for illustrating a case where there is a gutter 40 at the left edge of the roadway 34. FIG. 8 shows a situation where the gutter 40 lies within the field of view of the image pickup device 26, but the vehicle 10 has not adequately approached the gutter 40. In this case, the shadow 22a of the right wall of the gutter 40 cast by the infrared light 22 from the illuminating device 18 and the shadow 24a of the right wall of the gutter 40 cast by the infrared light 24 from the illuminating device 20 alternately appear. The whole area of the shadow 22a is included in the area of the shadow 24a. The shadow 22a cast by the infrared light 22 completely lies within the blind spot of the image pickup device 26 caused by the right wall of the gutter 40 and therefore does not appear in the image taken by the image pickup device 26. As for the shadow 24a cast by the infrared light 24, a part outside the blind spot of the image pickup device 26 caused by the right wall of the gutter 40 appears in the image taken by the image pickup device 26. FIGS. 9A and 9B show images displayed on the screen of the image monitor 32 in this situation. As shown in FIG. 9A, when the right illuminating device 20 is turned on, the shadow 24a appears in the image. As shown in FIG. 9B, when the left illuminating device 18 is turned on, the shadow 22a does not appear in the image. FIG. 10 shows a situation where the vehicle 10 has adequately approached the gutter 40, and the illuminating devices 18 and 20 are positioned in the region (within the width of the gutter 40) directly above the gutter 40. In this case, the infrared light 22 and 24 from the illuminating devices 18 and 20 cast no shadow of the gutter 40. FIGS. 11A and 11B show images displayed on the screen of the image monitor 32 in this situation. No shadow appears in both the image taken when the right illuminating device 20 is turned on shown in FIG. 11A and the image taken when the left illuminating device 18 is turned on shown in FIG. 11B. Therefore, when the display changes from the images shown in FIGS. 9A and 9B to the images shown in FIGS. 11A and 11B, the driver can determine that the vehicle 10 has adequately approached the gutter 40 and can stop the operation for pulling over.

While the image taken by the image pickup device 26 is directly displayed on the image monitor 32 in the embodiment described above, a binarization or other image processing may be performed on the image taken by the image pickup device 26 to enhance the curb 38 or gutter 40 before the image is displayed on the image monitor 32. As an alternative to displaying the image taken by the image pickup device 26 on the image monitor 32 (or in addition to displaying the image on the image monitor 32), the image taken by the image pickup device 26 may be input to an image recognition device 42, the image recognition device 42 may determine that the display changes from the images shown in FIGS. 5A and 5B to the images shown in FIGS. 7A and 7B or from the images shown in FIGS. 9A and 9B to the images shown in FIGS. 11A and 11B by using a pattern recognition technique, and an informing device 44 may inform the driver of the approaching state to the curb 38 or gutter 40 by light, sound or the like, as shown by the alternate long and two short dash line in FIG. 2. Furthermore, while the present invention is applied to the left side mirror of a car with a right-hand steering wheel in the embodiment described above, the present invention can also be applied to the right side mirror of a car with a left-hand steering wheel; the present invention can be applied to the left and right side mirrors of cars with a left-hand steering wheel and cars with a right-hand steering wheel.

The shadow of the curb, the gutter or the like can also be imaged by a combination of one infrared illuminating device facing downwardly mounted on the exterior mirror for a vehicle at a position close to the base of the mirror and an image pickup device facing downwardly mounted on the mirror at a position close to the tip of the mirror. However, in this case, the shadows alternately appearing at horizontally different positions shown in FIGS. 7A and 7B are not displayed even when the vehicle has adequately approached the curb. Therefore, the driver cannot readily determine whether the vehicle has adequately approached the curb.

What is claimed is:

1. An exterior mirror for a vehicle, comprising:
    left and right illuminating devices that are mounted on external arrangement sections of the exterior mirror for a vehicle that protrude from a side surface of the vehicle at a distance from each other in the lateral direction of the vehicle and emit infrared light downwardly;
    a lighting control device that alternately turns on the left and right illuminating devices; and
    an image pickup device sensitive to infrared light that is mounted to face downwardly at a middle position between the left and right illuminating devices mounted on the external arrangement sections and takes an image of a lower area at the side of the vehicle illuminated by the left and right illuminating devices,
    wherein the lighting control device alternately turns on the left and right illuminating devices with a lighting period of 0.3 seconds to 3 seconds.

2. The exterior mirror for a vehicle according to claim 1, further comprising:
    a display control device that displays the image taken by the image pickup device on an image monitor.

3. The exterior mirror for a vehicle according to claim 1, wherein the lighting control device alternately turns on the left and right illuminating devices in response to one of a hazard warning light and turning signal of the vehicle being on.

4. The exterior mirror for a vehicle according to claim 1, further comprising an image recognition device that receives an image taken by the image pickup device to determine a change in the image taken by the image pickup device from a previous image taken by the image pickup device, wherein the change in the image is utilized to inform a driver of one of an approaching curb and gutter.

5. The exterior mirror for a vehicle according to claim 3, further comprising an image recognition device that receives an image taken by the image pickup device to determine a change in the image taken by the image pickup device from a previous image taken by the image pickup device, wherein the change in the image is utilized to inform a driver of one of an approaching curb and gutter.

* * * * *